(12) United States Patent
Tsukamoto

(10) Patent No.: US 9,001,376 B2
(45) Date of Patent: Apr. 7, 2015

(54) IMAGE PROCESSING APPARATUS, IMAGE PROCESSING METHOD, PRINT ORDER RECEIVING APPARATUS, AND PRINT ORDER RECEIVING METHOD

(75) Inventor: Akihiro Tsukamoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 296 days.

(21) Appl. No.: 13/247,292

(22) Filed: Sep. 28, 2011

(65) Prior Publication Data

US 2012/0081725 A1    Apr. 5, 2012

(30) Foreign Application Priority Data

Sep. 30, 2010  (JP) .................................. 2010-220816
Nov. 30, 2010  (JP) .................................. 2010-266169
Jul. 25, 2011  (JP) .................................. 2011-161843

(51) Int. Cl.
| | |
|---|---|
| G06K 15/02 | (2006.01) |
| H04N 1/60 | (2006.01) |
| H04N 1/407 | (2006.01) |
| G06T 11/00 | (2006.01) |

(52) U.S. Cl.
CPC ............. *H04N 1/6011* (2013.01); *H04N 1/407* (2013.01); *H04N 1/6027* (2013.01); *G06T 11/001* (2013.01)

(58) Field of Classification Search
CPC ......... H04N 1/407; H04N 9/643; H04N 1/60; H04N 1/622; G06F 3/14
USPC .......... 358/1.2, 1.9, 2.1, 3.23, 1.15, 518, 523, 358/528; 382/167; 345/589, 593, 619
See application file for complete search history.

(56) References Cited

U.S. PATENT DOCUMENTS

| | | | |
|---|---|---|---|
| 5,621,868 A | 4/1997 | Mizutani et al. | |
| 6,657,658 B2 | 12/2003 | Takemura | |
| 7,839,535 B2 | 11/2010 | Moriya et al. | |
| 8,213,044 B2 | 7/2012 | Moriya et al. | |
| 2003/0090690 A1* | 5/2003 | Katayama et al. ............. | 358/1.9 |

(Continued)

FOREIGN PATENT DOCUMENTS

| | | |
|---|---|---|
| JP | 8-44867 A | 2/1996 |
| JP | 11-088672 A | 3/1999 |

(Continued)

OTHER PUBLICATIONS

Japanese Office Action dated Nov. 20, 2012 (and English translation thereof) in counterpart Japanese Application No. 2011-161843.

(Continued)

*Primary Examiner* — Jamares Q Washington
(74) *Attorney, Agent, or Firm* — Holtz, Holtz, Goodman & Chick PC

(57) ABSTRACT

An image processing apparatus includes a receiver which receives original image data from a terminal, a converter which converts the original image data to tone-changed image, a storing unit which stores parameter groups for converting the original image data, the parameter groups including a first parameter group for RGB components and a second parameter group for YMCK components, a print size selector, and a print controller which issues a print instruction for the converted image data. A display controller allows the terminal to display the converted image data obtained by using the first parameter group. The print controller issues a print instruction for the converted image data obtained by using the second parameter group.

6 Claims, 11 Drawing Sheets

(56) References Cited

U.S. PATENT DOCUMENTS

| | | | |
|---|---|---|---|
| 2004/0109014 A1* | 6/2004 | Henderson | 345/716 |
| 2005/0047684 A1* | 3/2005 | Baum et al. | 382/311 |
| 2005/0212819 A1* | 9/2005 | Kubo et al. | 345/619 |

FOREIGN PATENT DOCUMENTS

| | | |
|---|---|---|
| JP | 2004-213598 A | 7/2004 |
| JP | 2006-3603 A | 1/2006 |
| JP | 2006-309462 A | 11/2006 |
| JP | 2008-099242 A | 4/2008 |

OTHER PUBLICATIONS

Chinese Office Action dated Jan. 20, 2014 (and English translation thereof) issued in counterpart Chinese Application No. 201110305250.2.

Chinese Office Action dated Aug. 29, 2014, issued in counterpart Chinese Application No. 201110305250.2.

* cited by examiner

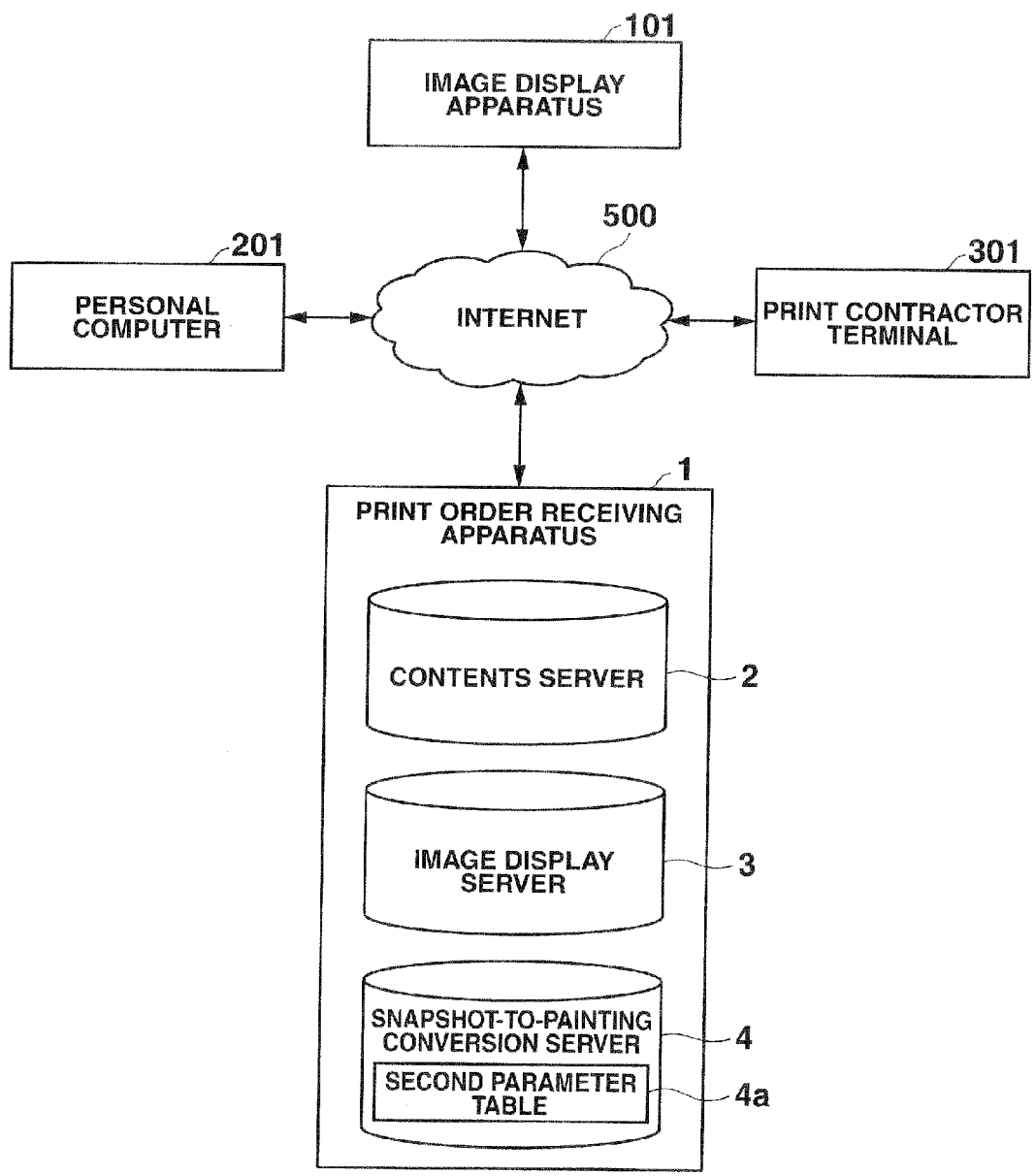

| OIL PAINTING TONE (n1) | WATER COLOR PAINTING TONE (n2) | PASTEL TONE (n3) | CRAYON DRAWING TONE (n4) | . . . |
|---|---|---|---|---|
| PARAMETER GROUP P (n1) | PARAMETER GROUP P (n2) | PARAMETER GROUP P (n3) | PARAMETER GROUP P (n4) | |

| | OIL PAINTING TONE (n1) | WATER COLOR PAINTING TONE (n2) | PASTEL TONE (n3) | CRAYON DRAWING TONE (n4) | ... |
|---|---|---|---|---|---|
| E PRINT SIZE (s1) | PARAMETER GROUPS P (s1) (n1) | PARAMETER GROUPS P (s1) (n2) | PARAMETER GROUPS P (s1) (n3) | PARAMETER GROUPS P (s1) (n4) | |
| L PRINT SIZE (s2) | PARAMETER GROUPS P (s2) (n1) | PARAMETER GROUPS P (s2) (n2) | PARAMETER GROUPS P (s2) (n3) | PARAMETER GROUPS P (s2) (n4) | |
| POSTCARD SIZE (s3) | PARAMETER GROUPS P (s3) (n1) | PARAMETER GROUPS P (s3) (n2) | PARAMETER GROUPS P (s3) (n3) | PARAMETER GROUPS P (s3) (n4) | |
| 2L PRINT SIZE (s4) | PARAMETER GROUPS P (s4) (n1) | PARAMETER GROUPS P (s4) (n2) | PARAMETER GROUPS P (s4) (n3) | PARAMETER GROUPS P (s4) (n4) | |
| CABINET SIZE (s5) | PARAMETER GROUPS P (s5) (n1) | PARAMETER GROUPS P (s5) (n2) | PARAMETER GROUPS P (s5) (n3) | PARAMETER GROUPS P (s5) (n4) | |
| SIXMO SIZE (s6) | PARAMETER GROUPS P (s6) (n1) | PARAMETER GROUPS P (s6) (n2) | PARAMETER GROUPS P (s6) (n3) | PARAMETER GROUPS P (s6) (n4) | |
| QUARTER SIZE (s7) | PARAMETER GROUPS P (s7) (n1) | PARAMETER GROUPS P (s7) (n2) | PARAMETER GROUPS P (s7) (n3) | PARAMETER GROUPS P (s7) (n4) | |
| B5 (s8) | PARAMETER GROUPS P (s8) (n1) | PARAMETER GROUPS P (s8) (n2) | PARAMETER GROUPS P (s8) (n3) | PARAMETER GROUPS P (s8) (n4) | |
| A4 (s9) | PARAMETER GROUPS P (s9) (n1) | PARAMETER GROUPS P (s9) (n2) | PARAMETER GROUPS P (s9) (n3) | PARAMETER GROUPS P (s9) (n4) | |
| A3 (s10) | PARAMETER GROUPS P (s10) (n1) | PARAMETER GROUPS P (s10) (n2) | PARAMETER GROUPS P (s10) (n3) | PARAMETER GROUPS P (s10) (n4) | |
| POSTER (s11) | PARAMETER GROUPS P (s11) (n1) | PARAMETER GROUPS P (s11) (n2) | PARAMETER GROUPS P (s11) (n3) | PARAMETER GROUPS P (s11) (n4) | |
| ... | | | | | |

IMAGE PROCESSING APPARATUS, IMAGE PROCESSING METHOD, PRINT ORDER RECEIVING APPARATUS, AND PRINT ORDER RECEIVING METHOD

CROSS-REFERENCE TO RELATED APPLICATIONS

This application is based upon and claims the benefit of priority from prior Japanese Patent Applications No. 2010-220816, filed Sep. 30, 2010; No. 2010-266169, filed Nov. 30, 2010, and No. 2011-161843, filed Jul. 25, 2011, the entire contents of all of which are incorporated herein by reference.

BACKGROUND OF THE INVENTION

1. Field of the Invention

The present invention relates to a technology of changing a tone of image data, and more particularly to an image processing apparatus, an image processing method, and a print order receiving apparatus that use the Internet.

2. Description of the Related Art

In recent years, with spread of digital cameras, it is general to save photos as digital image data. Since the digital image data can be viewed in a digital camera used for shooting or viewed in, e.g., a personal computer having the image data taken therein, how to enjoy photos has been changed. For example, there has been suggested a technology that enables converting to an image having a specific tone, e.g., a painterly tone with a different taste based on an original photo and displaying the converted image by applying image processing (snapshot to painting conversion) (see, e.g., Jpn. Pat. Appln. KOKAI Publication No. 8-44867 (corresponding to U.S. Pat. No. 5,621,868) and Jpn. Pat. Appln. KOKAI Publication No, 2004-213598).

Further, a technology that enables comparing an original image with a converted image has been also suggested (see, e.g., Jpn. Pat. Appln. KOKAI Publication No. 2006-3603 (corresponding to U.S. Pat. No. 7,602,993 B2).

The snapshot-to-painting conversion is a technology that gives an arbitrary image a painterly tone by processing each pixel constituting the image in accordance with a predetermined conversion algorithm. In more detail, this technology converts an image such as a photo to an image having a tone such as an oil painting tone, a water color painting tone, an oil painting tone, a pastel tone, a color pencil drawing tone, a crayon drawing tone, an illustration tone, a pointillism tone, an air brush, a silk screen tone, a needlework painting tone, or a collage (pasting) tone.

Although the snapshot-to-painting conversion is the same as effect processing of brightening, sharpening, or softening an image in principle, the snapshot-to-painting conversion enables advanced conversion since combinations of parameters used in the effect processing are optimized in accordance with each tone which is a conversion target. That is, if there are 12 types of tones, there are prepared 12 parameter groups which are combinations of parameters.

As described above, although the snapshot-to-painting conversion enables the advanced conversion by using parameter groups prepared in accordance with a tone as a conversion target, such conversion is mainly performed for the purpose of viewing a converted image on a display screen in the conventional technology. Therefore, when printing a converted image, there occurs the following problem.

That is, in recent years, progress of the printing technology using, e.g., a printer is prominent, and a print having a reasonable tone can be obtained even if image data subjected to the snapshot-to-painting conversion is printed as it is.

However, when the image data as a display image subjected to the snapshot-to-painting conversion is printed as it is, exact texture of a painterly tone is hardly obtained. That is, when parameters for the snapshot-to-painting conversion are appropriately adjusted on the premise of a predetermined display size and a predetermined number of display pixels, there occurs a problem that appropriate adjustment of the parameter may be possibly jeopardized when image data is printed with a different size and a different number of pixels.

As one of factors of this problem, display image data consists of RGB components as three primary colors of light, whereas this data is printed with color components of YMCK at the time of printing.

Further, as another factor, image data which has been subjected to the snapshot-to-painting conversion and is displayed in the display screen and image data which has been subjected to snapshot-to-printing conversion and is to be actually printed have different numbers of pixels.

BRIEF SUMMARY OF THE INVENTION

It is an object of the present invention to provide an image processing apparatus, an image processing method, a print order receiving apparatus, and a program that enable generation of image data to be printed with a more exact tone when converting a tone of image data and performing printing in an arbitrary size while confirming the image data in a display screen of a terminal.

According to the present invention, when converting a tone of image data and performing printing in an arbitrary size while confirming the image data in a display screen of a terminal, image data used for printing with a more exact tone can be generated.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention together with the general description given above and the detailed description of the embodiments given below, serve to explain the principles of the present invention.

FIG. 1 is a conceptual view showing a configuration of a network system including a print order receiving apparatus to which the present invention is applied.

FIG. 6 is a conceptual view showing a first parameter table.

FIG. 7 is a conceptual view showing a second parameter table.

DETAILED DESCRIPTION OF THE INVENTION

Figure 2A:
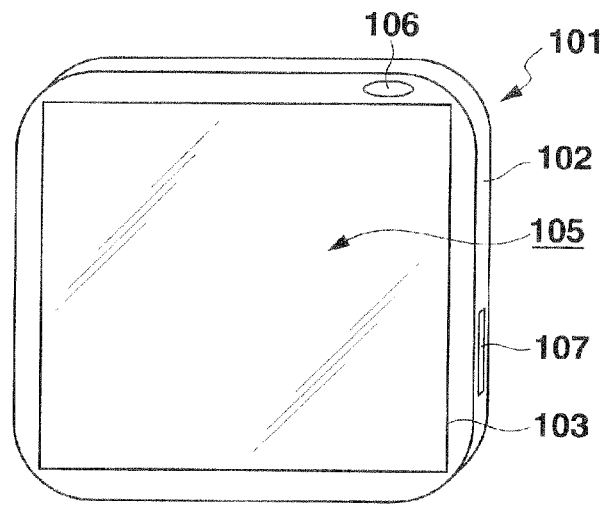
FIG. 2A is an appearance diagram showing an image display apparatus.

An embodiment of the present invention will now be described with reference to the accompanying drawings.

FIG. 1 is a conceptual view showing a configuration of a network system including a print order receiving apparatus 1 to which the preset invention is applied. The print order receiving apparatus 1 constitutes a network service site, and the print order receiving apparatus 1 is connected to an image display apparatus 101, a personal computer 20, and a print contractor terminal 301 through the Internet 500.

The print order receiving apparatus 1 renders a network service of converting image data uploaded from the image display apparatus 101 or the personal computer 201 to image data having a painterly tone, transmitting the converted image data to a predetermined print contractor, and placing an order with the print contractor for printing an image having a painterly tone (which will be referred to as a painterly image hereinafter). The print contractor terminal 301 is a terminal owned by the print contractor.

The image display apparatus 101 has a function of converting an original image to a painterly image and displaying the converted image and has a function of converting an original image to a painterly image, and it is an arbitrary information device such as a digital camera and a cellular phone unit. The original image includes not only a photographic image acquired as image data by shooting but also image data acquired by scanning, image data created by an image creating application, and others. FIG. 2A is an appearance drawing showing the image display apparatus 101.

As shown in FIG. 2A, a display unit constituted of a liquid crystal display panel 103 held by a main body 102 is arranged on a front surface of the image display apparatus 101. A touch panel 105 is integrally formed in this liquid crystal display panel 103, and this panel can be operated when touched with a finger. An imaging element 106 is provided on an upper right side on a front surface of the main body 2, and a memory card slot 107 is provided on a side surface of the same.

Figure 3:
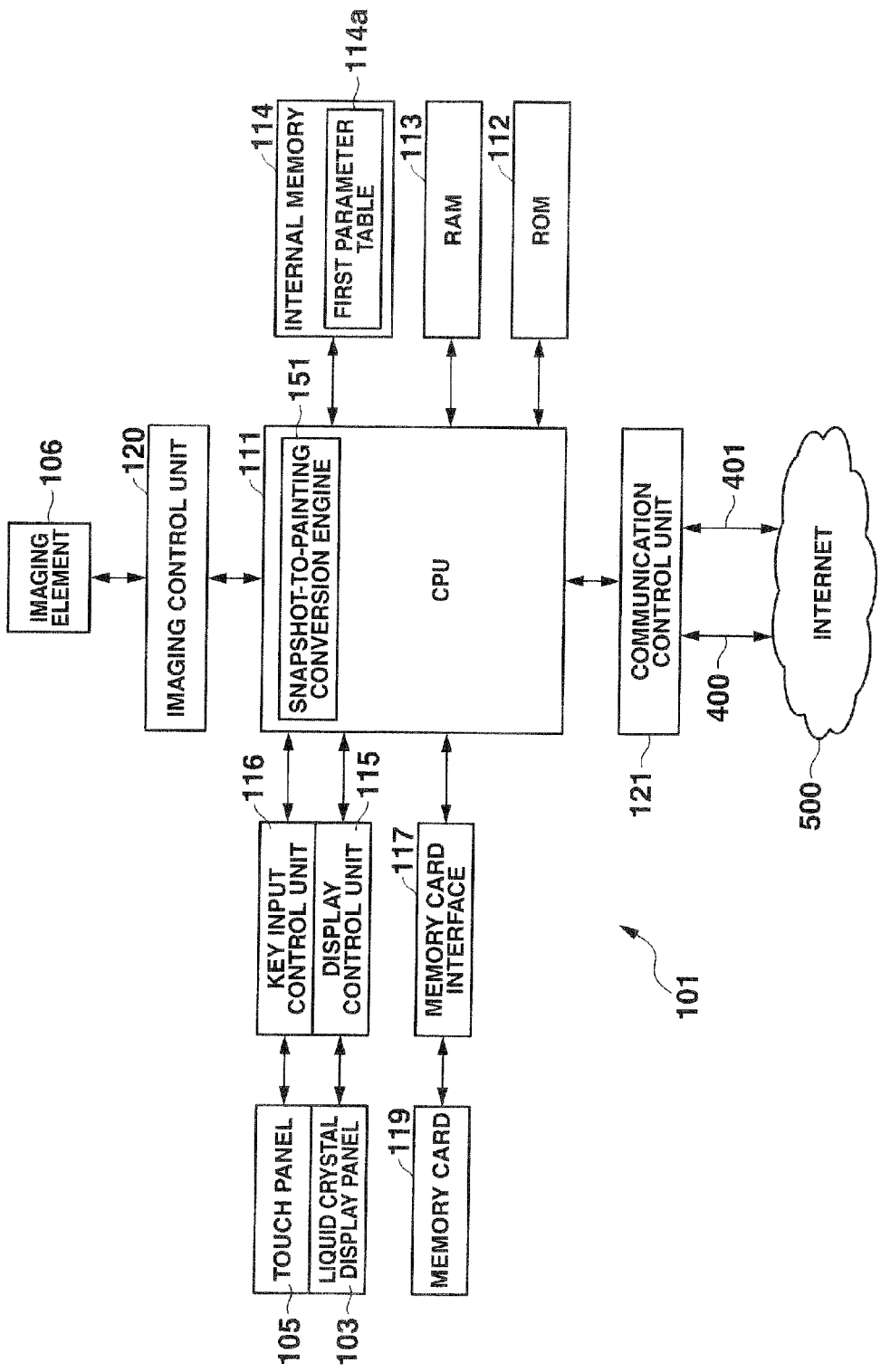
FIG. 3 is a block diagram showing an electrical configuration of the image display apparatus.

FIG. 3 is a block diagram showing an electrical configuration of the image display apparatus 101. The image display apparatus 101 includes a CPU (Central Processing Unit) 111, an ROM (Read Only Memory) 112 connected to the CPU 111, an RAM (Random Access Memory) 113, and an internal memory 114. The ROM 112 stores a program that allows the CPU 111 to perform an operation shown in a later-described flowchart. Further, the CPU 111 includes a snapshot-to-painting conversion engine 151 that converts a photographic image or the like to a painterly image.

The RAM 113 is a work memory that is used by the CPU 111 to temporarily store various kinds of data as required. The internal memory 114 is a large-capacity nonvolatile memory constituted of a hard disk or a flash memory. The internal memory 114 stores a later-described first parameter table 114a.

A display control unit 115 drives the liquid crystal display panel 103 based on display image data supplied from the CPU 111 to display images or various kinds of menus in the liquid crystal display panel 103. A key input control unit 116 inputs an operation signal of the touch panel 105 under control of the CPU 111.

As the touch panel 105, it is possible to appropriately select one from various existing systems such as an electrostatic capacitance system, an optical system, a resistive film system, a surface acoustic wave system, an ultrasonic wave system, an electromagnetic induction system, and others. Functions of fingerprint authentication, vein authentication, and others can be also incorporated.

A memory card interface 117 is an input/output interface that controls input/output of data between various kinds of memory cards 119 detachably mounted in the memory card slot 107 and the CPU 111.

An imaging control unit 120 drives the imaging element 108 to control capture of an image of subject. Image data captured as Bayer data is YUV data, and it is converted to BOB data, compressed to JPEG (Joint Photographic Experts Group) data, and stored in the internal memory 114 or the memory card 119.

Figure 4:
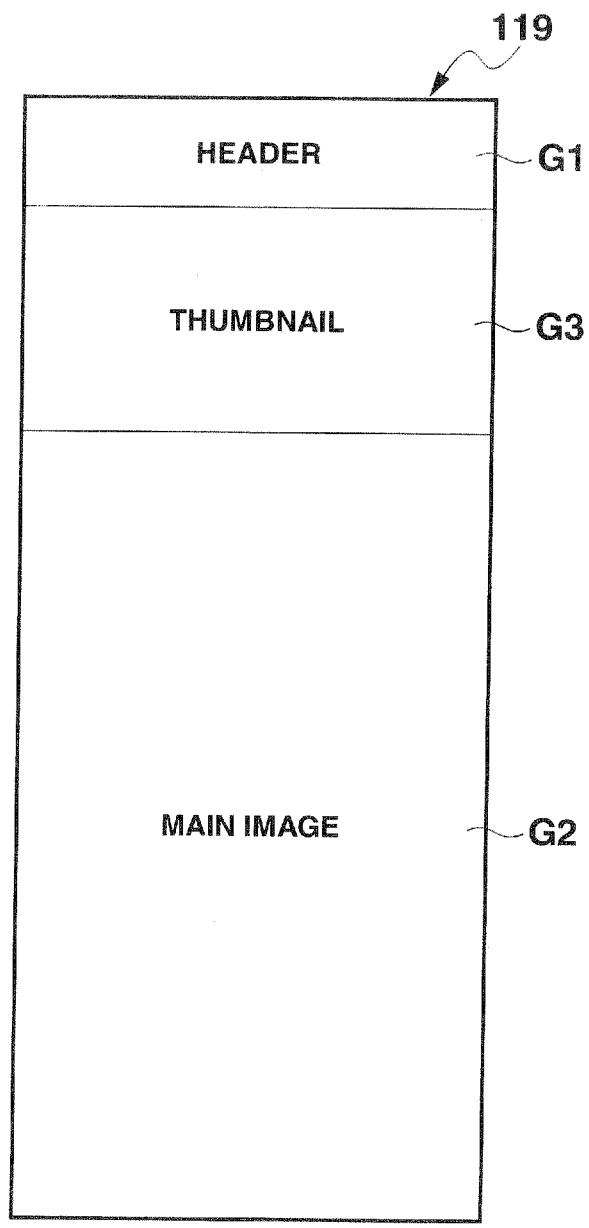
FIG. 4 is a conceptual view showing a configuration of an image file stored in a memory card of the image display apparatus.

FIG. 4 is a conceptual view showing a configuration of an image file stored in the memory card 119. Each image file includes pieces of image data, i.e., a header G1 having data of, e.g., EXIF (Exchangeable Image File Format), image data G2 which is an image acquired by shooting and is also a main image, a thumbnail G3 which is a reduced image of the image data G2. It is to be noted that a size of the reduced image which should be displayed in a display screen differs depending on a size of the screen, and hence a display preview image may be created and stored in addition to the thumbnail in some cases. In this embodiment, the reduced image is represented as a thumbnail including a preview image.

That is, the image file conforms to a general digital camera format. Therefore, as the memory card 119, for example, an SD card used for storing images captured by a digital camera can suffice, and this card can be used by being simply inserted to the memory card slot 107. As a format of the image file, it is possible to appropriately cope with various kinds of formats, e.g., JPEG, GIF (Graphics Interchange Format), AVI (Audio Video Interleave), PNG (Portable Network Graphics), and others.

A communication control unit 121 connects the image display apparatus 101 to the Internet 500 through a telephone line 400 or a wireless LAN 401 to perform communication control including upload of image data to the print order receiving apparatus 1, transmission/reception of mails, and transmission/reception of contents.

On the other hand, the snapshot-to-painting conversion engine 151 is constituted of, e.g., an ASIC (Application. Specific Integrated Circuit), a DSP (Digital Signal Processor), or a reconfigurable LSI (an LSI that can be reconfigured by a program such as C language) that cooperates with the CPU 111.

The snapshot-to-painting conversion engine 151 executes snapshot-to-painting conversion of converting an image stored as image data in the memory card 119 to a painterly image and displays the converted painterly image in the liquid crystal display panel 103. The snapshot-to-painting conversion processing in the snapshot-to-painting conversion engine 151 includes processing that processes respective pixels constituting an image in accordance with a predetermined conversion algorithm by using predetermined parameters (snapshot-to-painting conversion parameters) like the conventional examples.

A type of a picture that is a conversion target, i.e., a tone (a tone) that is assured for a converted image is selectable in the snapshot-to-painting processing, and there are prepared oil painting, thick oil painting, Gothic oil painting, fauvist oil painting, water color painting, gouache painting, pastel painting, color pencil sketch, pointillism, silkscreen, drawing, air brush, and others as selectable tones in this embodiment. It is to be noted that the present invention is not restricted to these tones, and conversion having a tinge of artist's characteristics, e.g., Gogh style, Monet style, Picasso style, and others can be selected as selectable tones. Further, algorithms of different tones may be provided from the memory card 119.

Here, as described above, the snapshot-to-painting conversion in the snapshot-to-painting conversion engine 151 basically includes processing of performing conversion to show a painterly tone by adjusting/combining parameters of various kinds of effect processing (filter processing) known in photo-retouching software.

Furthermore, the parameters used in the snapshot-to-painting conversion processing are elements for applying the effect processing to pixels. That is, the pixels are generally represented in gradations each consisting of bits of RGB, but they are elements for performing arithmetic operations with respect to its bit data. For example, in case of adding emphasis to red, "2", "0.9", and "0.5" when performing arithmetic operations like R×2, G×0.9, and B×0.5 are kinds of parameters. Alternatively, when arithmetic operation elements are programmed in advance and arithmetic operations such as R×1.1 for an emphasis degree 1 of red, R×1.2 for an emphasis degree 2, and R×1.3 for an emphasis degree 3 are carried out, each of these emphasis degrees is also a kind of parameters.

Moreover, predetermined arithmetic operations may be performed with respect to a target pixel and adjacent pixels. For example, when pixels P1(R, G, B), P2(R, G, B), P3(R, G, B), P4(R, G, B), P5(R, G, B), P6(R, G, B), P7(R, G, B), P8(R, G, B), and P9(R, G, B) are aligned in upper, lower, left, and right directions with a target pixel P5(R, G, B) at the center, an arithmetic operation P5(R)=P1(R)×n1+P2(R)×n2+P3(R)×n3+P4(R)×n4+P5(R)×n5+P6(R)×n6+P7(R)×n7+P8(R)×n8+P9(R)×n9 is executed with respect to P5(R), and the same arithmetic operation is carried out with respect to G and B. The symbol "n" is a parameter, and changing this numerical value (a coefficient) enables performing different effect processing.

As other examples of effect processing, there are texture processing of mapping texture to an image to provide special feel of a material and resolution processing of classifying images into a texture portion and a flat portion such as an outline portion and a fine pattern and appropriately processing these portions to increase senses of a material and a resolution. Additionally, as examples of the effect processing, there are HSV processing of classifying a color into three elements, i.e., hue, saturation, and a value and adjusting these elements, RGB processing of adjusting degrees of respective colors, i.e., R (red), G (green), and B (blue), RGB switching processing of switching R to G, G to B, and B to R, and edge extraction processing of performing filtering called Laplacian filtering.

Additionally, as examples of the effect processing, there are intermediate density extraction processing of performing filtering called median filtering, contrast correction processing of extracting histograms of RGB of adjacent pixels and appropriately distributing or extending the histograms of the pixels, gamma correction processing of maintaining a bright portion and a dark portion to adjust intermediate brightness, and shadow processing of brightening a dark region or darkening a bright region in an image. Further, as examples of the effect processing, there are solarization processing of inverting RGB values when the RGB values of each pixel have brightness equal to or above a threshold value, noise addition processing of randomly drawing dots to generate noise and adjusting an amount or a color of the noise, and others.

Furthermore, as an example of the effect processing, there is processing of giving specific touch (brush touch) to a converted image. Specifically, a color or the like is determined as a reference, and pixels having a high correlation are collected from pixels constituting image data to form each group. Subsequently, regard to the pixels in the respective groups, colors of the pixels in the same group are substituted by a representative color of this group. The group of the pixels whose colors have been substituted by the representative color forms each brush touch. According to this image processing treatment, the brush touch to be formed can be changed by varying how to correlate the pixels collected as the group and a share (a length (a distance), a degree of flatness) of the group constituted of pixels having the same color (a representative color), thereby changing a tone of an image expressed by the image data to various painterly tones.

Changing each of pieces of image data to different brush touches can be realized by adjusting a shape of the group of the collected pixels constituting the brush touch, e.g., a degree of flatness of the group. When the degree of flatness of the group constituted of the pixels having the same color representing the brush touch is increased, the brush touch is thickened, and a rough touch of the image is thereby displayed. When the degree of flatness of the group constituted of the pixels having the same color is reduced, the small brush touch can be made, thereby displaying a fine touch of the image.

Figure 5A:
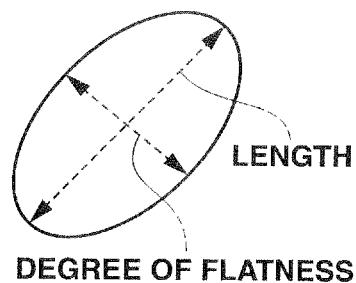
FIGS. 5A, 5B, and 5C are explanatory views each showing an example of snapshot-to-painting conversion processing contents, i.e., an example of a group of pixels representing brush touch.
Figure 5B:
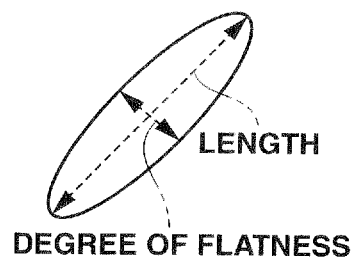
Figure 5C:
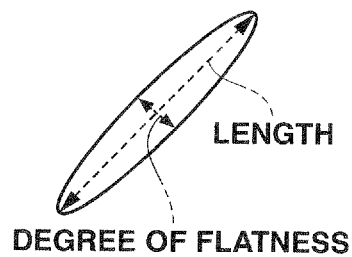

Each of FIGS. 5A, 5B, and 5C shows an example of the group of pixels expressing the brush touch generated as described above. For example, as shown in FIG. 5A, when a degree of flatness of the group constituted of pixels having the same color expressing the brush touch is increased, the brush touch is thickened, whereby an image is displayed with a rough touch. As shown in FIG. 5C, when a degree of flatness of the group constituted of pixels having the same color is reduced, a small brush touch can be formed, whereby an image is displayed with a fine touch. The group shown in FIG. 5B represents a standard brush touch.

A degree of correlation of the pixels, a length and a degree of flatness representing a shape of the group used in the effect processing for giving a specific touch (the brush touch) as described above are also types of parameters used in the snapshot-to-painting conversion like other parameters used in the other effect processing explained above.

Further, information indicative of an appropriate combination of parameters (snapshot-to-painting conversion parameters) required in the various kinds of effect processing is stored as the first parameter table 114a in the internal memory 114. Here, the appropriate combination of the parameters means a combination that enables acquiring a conversion target tone when image data after the snapshot-to-painting conversion is used for display and each effect processing is performed with respect to RGB components in the image data.

FIG. 6 is a conceptual view schematically showing the first parameter table 114a stored in the internal memory 114. As shown in FIG. 6, in the first parameter table 114a, parameter groups P(n1), P(n2), P(n3), . . . associated with various types of tones n1, n2, n3, . . . are stored, and values of parameters constituting the respective parameter groups P(n1), P(n2), P(n3), . . . are set in accordance with different tones in advance. It is to be noted that the respective parameter groups P(n1), P(n2), P(n3), . . . shown in FIG. 6 will be referred to as first parameter groups in the following description.

Further, in the image display apparatus 101, when the CPU 111 operates in accordance with a program stored in the ROM 112 to display a list of images stored in the memory card 119 in the liquid crystal display panel 103, thumbnails subjected to snapshot-to-painting conversion (painterly images) can be displayed together with thumbnails of original images.

Figure 2B:
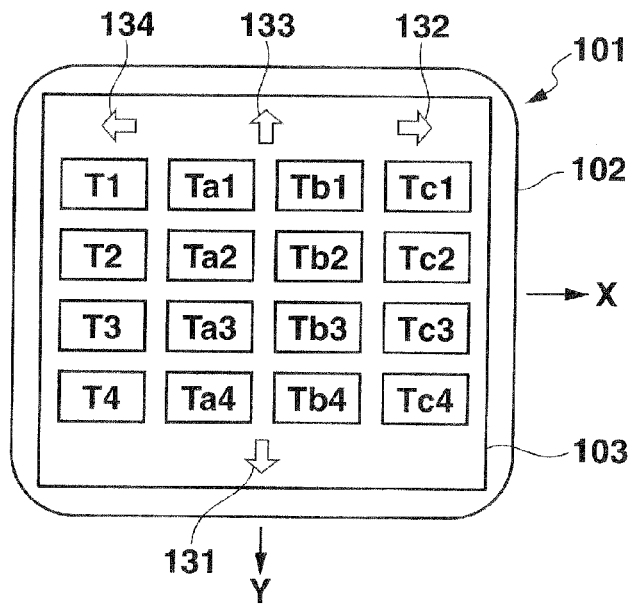
FIG. 2B is a view showing a display example of the image display apparatus.

FIG. 2B is a view showing a display example of the liquid crystal display panel 103 in such a case. In this example, a total of 4 thumbnail images including one thumbnail of an original image and three thumbnails of tone-changed images are displayed in the Liquid crystal display panel 103 in the row direction. That is, in the liquid crystal display panel 103, "Original thumbnail T1" to "Original thumbnail T4" are displayed at a left end in a column direction, and "Oil painting tone thumbnail Ta1", "Water color painting tone thumbnail Tb1", and "Pastel painting tone thumbnail Tc1" which are tone-changed images of "Original thumbnail T1" are displayed in the row direction in association with "Original Thumbnail T1". Furthermore, other "Original Thumbnail T2" to "Original Thumbnail T4" are displayed in the same manner, and "Oil painting tone thumbnail Ta2" to "Oil painting tone thumbnail Ta4", "Water color painting tone thumbnail Tb2" to "Water color painting tone thumbnail Tb4", and "Pastel painting tone thumbnail Tc2" to "Pastel painting tone thumbnail Tc4" which are respective corresponding tone-changed images are displayed in the column direction.

At the time of such display, the snapshot-to-painting conversion engine 151 executes the snapshot-to-painting conversion to "Original thumbnail T1" to "Original Thumbnail T4" to generate "Oil painting tone thumbnail Ta1" to "Oil painting tone thumbnail Ta4", "Water color painting tone thumbnail Tb1" to "Water color painting tone, thumbnail Tb4", and "Pastel painting tone thumbnail Tel" to "Pastel painting tone thumbnail Tc4", respectively. It is to be noted that reduced images displayed in the liquid crystal display panel 103 are represented as thumbnails based on the EXIF standard shown in FIG. 4, but what matters is that the thumbnail means an image obtained by resizing the original image for display of a list.

Moreover, when a list of thumbnails is displayed in the liquid crystal display panel 103, the CPU 111 displays a down page feed button 131, a right page feed button 132, an up page feed button 133, and a left page feed button 134 in the liquid crystal display panel 103.

In this state, a user can use his/her finger to perform a touch slide operation or a touch operation of the down page feed button 131 to downwardly scroll a displayed image group (an arrow Y) and perform a touch operation of the right page feed button 132 to scroll the same toward the right-hand side (an arrow X).

Additionally, for example, when the screen is downwardly scrolled with the touch operation of the liquid crystal display panel 103, a new original thumbnail read from the memory card 119 by the CPU 11 is displayed in the liquid crystal display panel 103, and new tone-changed image thumbnails generated from the new original thumbnail by the snapshot-to-painting conversion engine 151 are displayed in the liquid crystal display panel 103 at the same time.

Figure 2C:
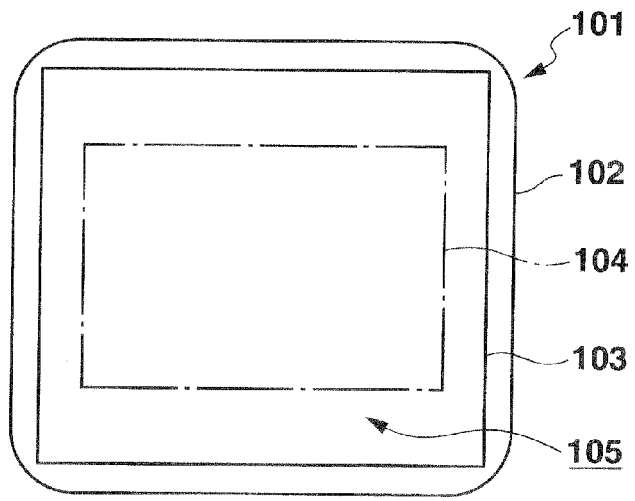
FIG. 2C is a view showing a display example of the image display apparatus.

Further, FIG. 2C is a view showing a display example when one of the thumbnails depicted in FIG. 2B is displayed in a full-screen mode, for example. That is, reference numeral 104 in the drawing denotes an image display region where an image having a size of, e.g., 800 pixels×600 pixels is displayed when placing an order of a print of a painterly tone image, and any other portion functions as the touch panel 105 that appropriately displays various kinds of operation buttons.

It is to be noted that the number of pixels in an original image is dependent on, e.g., a digital camera used for shooting, and there are standards like XGA (1024×768), SXGA (1280×1024), UXGA (1600×1200), QXGA (2048× 1536) . . . , and an image has 4000×3000 pixels in digital cameras adopting the standard of 10,000,000 pixels or above. Therefore, the full-screen display shown in FIG. 2C is carried out by, e.g., preparing a preview image having 800×600 pixels in advance or by minimizing the original image at the time of display.

On the other hand, as shown in FIG. 1, the print order receiving apparatus 1 mainly includes a contents server 102, an image display server 3, and a snapshot-to-painting server 4.

The contents server 2 stores image data received from the image display apparatus 101 and the like or supplies data of an image subjected to snapshot-to-painting conversion to the print contractor terminal 301 to pass an order of a print to a print contractor.

The image display server 3 is configured to execute interface processing with respect to a user when performing snapshot-to-painting conversion processing in this print order receiving apparatus 1. That is, it carries out processing concerning settings of a type of a painterly tone, a later-described clipping size, and a clipping position or screen display for guiding selection of a print size and others.

The snapshot-to-painting conversion server 4 is a server having the same function as the snapshot-to-painting conversion server 151 included in the image display apparatus 101. However, in the snapshot-to-painting conversion server 4, arbitrary storing means such as a non-illustrated ROM or a hard disk constituting this server stores a second parameter table 4a different from the first parameter table 114a (see FIG. 6).

FIG. 7 is a conceptual view schematically showing the second parameter table 4a. As shown in FIG. 7, in the second parameter table 4a, appropriate preset parameter groups P(s) (n) are stored in accordance with tone types, i.e., an oil painting tone (n1), a water color painting tone (n2), a pastel tone (n3), a crayon drawing tone (n4) . . . in association with an E print size (s1) to a poster (s11), a T-shirt (s12), and others which represent print sizes or print mediums. Here, the parameter group P(s1)(n1) is an appropriate parameter group when a print size is the E print size (s1) and a snapshot is converted to the oil painting tone (n1), and the parameter group P(s11) (n4) is an appropriate parameter group when a print size is the poster (s11) and a snapshot is converted to the crayon drawing tone (n4). In the following description, the parameter groups provided in accordance with print sizes or print mediums will be referred to as second parameter groups, and they are discriminated from the first parameter groups used in the image display apparatus 101.

Moreover, as different from the first parameter groups used in the image display apparatus 101, the second parameter groups 2 are set with respect to YMCK components of image data. That is, each second parameter group is an optimum combination of parameters that enables acquiring a conversion target tone when various kinds effect processing are executed with respect to the YMCK components in the image data.

It is to be noted that the snapshot-to-painting conversion server 4 also stores another parameter table in which the same parameter groups as those used in the image display apparatus 101 are stored. Additionally, each server included in the print order receiving apparatus 1 depicted in FIG. 1 includes controlling means mainly constituted of a high-performance CPU, nonvolatile storing means for storing a program that allows the CPU to execute later-described predetermined processing, and others. Further, the configuration of the print order receiving apparatus 1 depicted in FIG. 1 is just an example, audit can be changed to an arbitrary configuration as long as a function of each later-described server can be assured.

Figure 8:
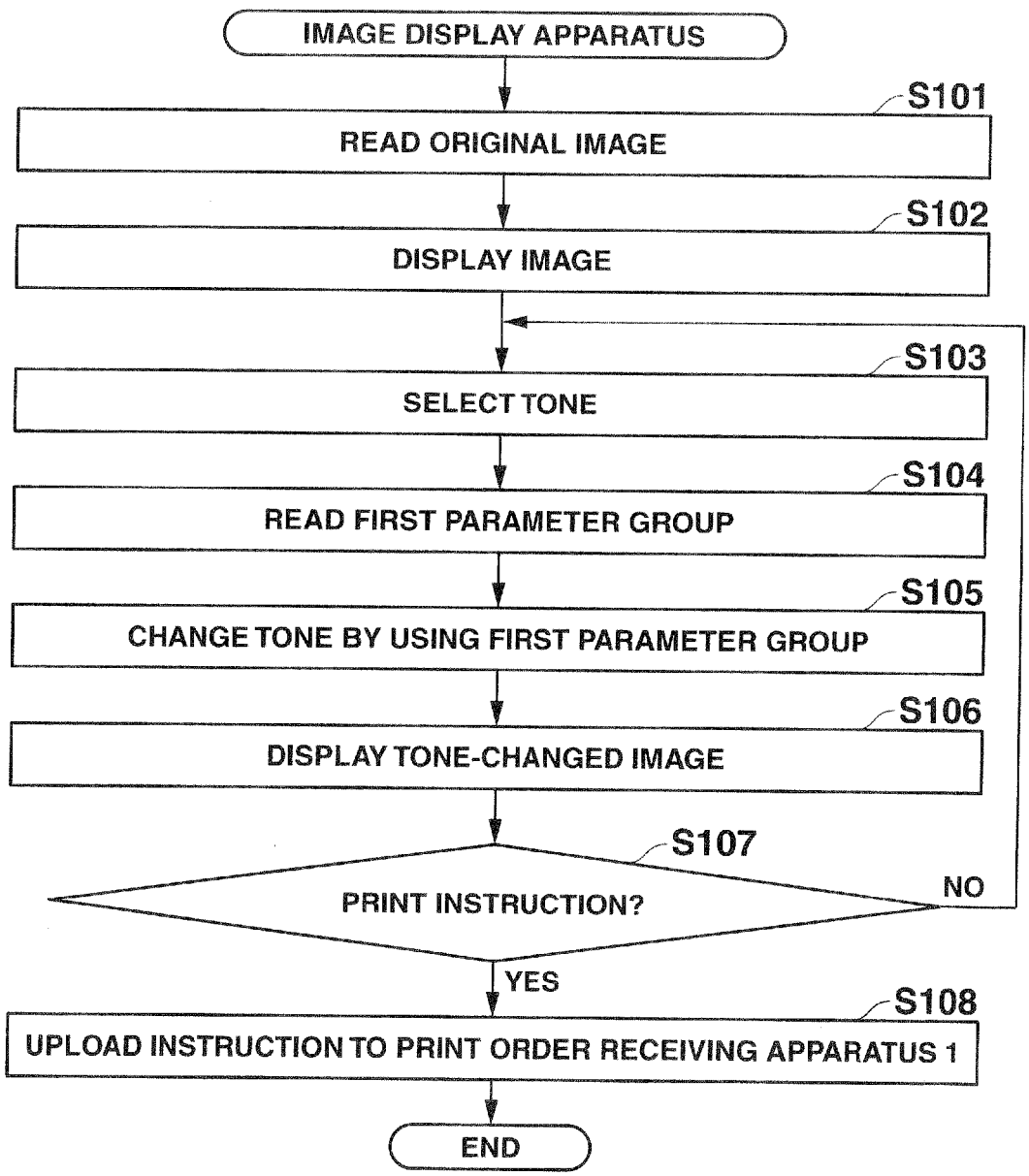
FIG. 8 is a flowchart showing an operation of the image display apparatus.

Description will now be given as to operations of the image display apparatus 101 and the print order receiving apparatus 1 according to this embodiment when a user uses the print order receiving apparatus 1 to place an order of a print of an arbitrary image subjected to snapshot-to-painting conversion with reference to flowcharts of FIG. 8 and FIG. 9.

First, an operation of the image display apparatus 101 side will be explained. FIG. 8 is a flowchart mainly showing a processing procedure of the CPU 111. As shown in FIG. 8, the CPU 111 reads image data of an original image (which will be referred to as original image data hereinafter) specified by a predetermined operation performed by a user (step S101) and displays the read data in the liquid crystal display panel 103 (step S102). Subsequently, the CPU 111 displays, e.g., a predetermined tone selection screen in the liquid crystal display panel 103, thereby allows the user to select a desired tone (step S103), and then reads a first parameter group associated with the selected tone from the first parameter table 114a (step S104). Further, the CPU 111 subjects the original image to snapshot-to-painting conversion by using the read first parameter group (step S106), and displays the tone-changed image in the liquid crystal display panel 103 (step S106). The single tone-changed image alone may be displayed as shown in FIG. 2C, or thumbnails may be displayed as shown in FIG. 2B.

Here, the first parameter group is set with respect to RGB components in the image data as described above, and it is suitable for generation of the tone-changed image that is displayed in the liquid crystal display panel 103. As a result, the tone-changed image appropriately converted to a desired tone can be displayed in the liquid crystal display panel 103, and a user can view this image.

Then, the CPU 111 determines whether a print instruction for the tone-changed image displayed in the liquid crystal display panel 103 has been issued from the user (step S107). When the print instruction has been issued, the CPU 111 uploads the data before conversion of the tone-changed image, i.e., the original image data read at step S101 to the print order receiving apparatus 1 through the Internet 500 (step S108).

Figure 9:
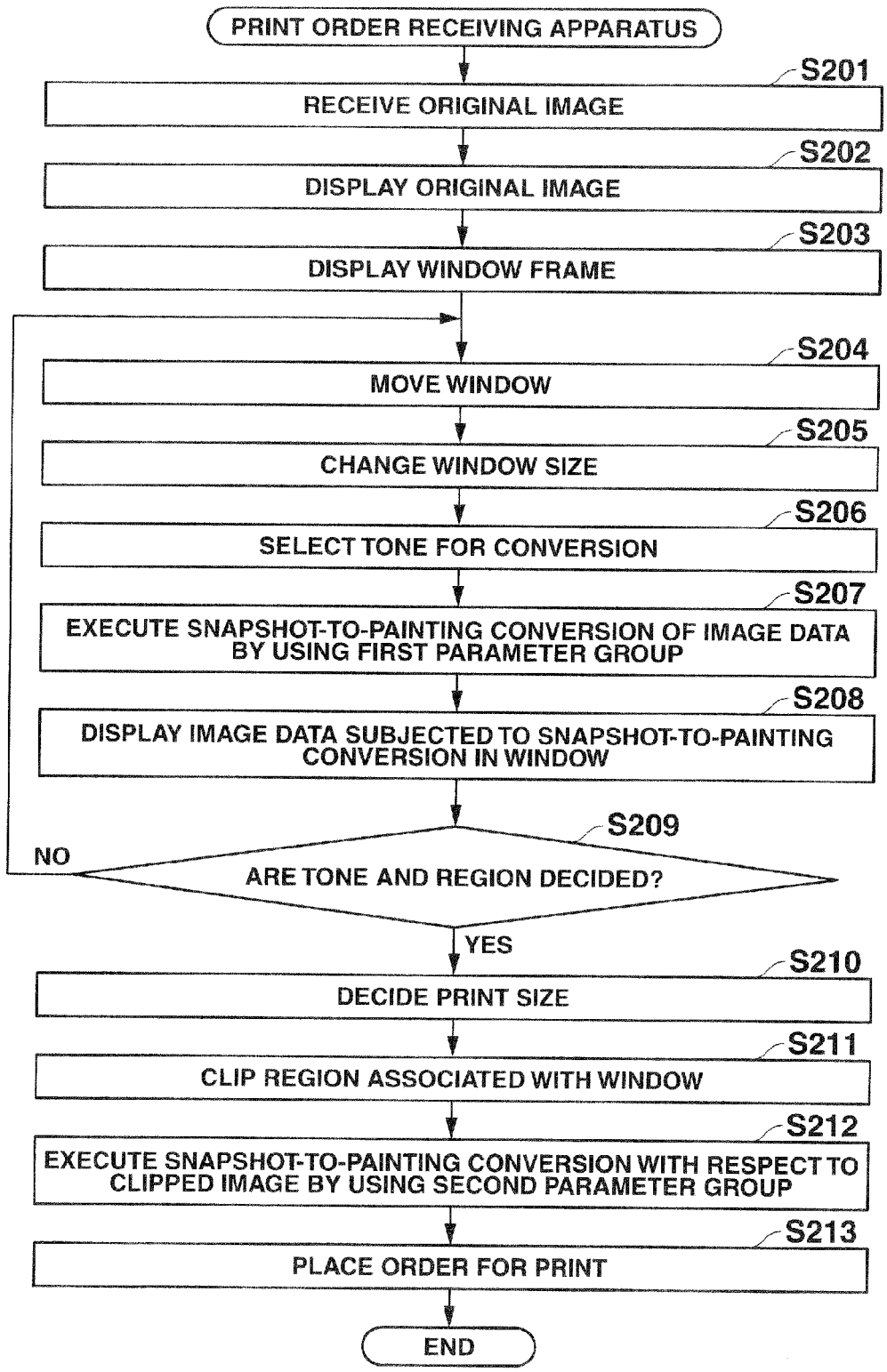
FIG. 9 is a flowchart showing an operation of the print order receiving apparatus.

On the other hand, as shown in a flowchart of FIG. 9, on the print order receiving apparatus 1 side, the contents server 2 receives the original image data uploaded from the image display apparatus 101 and temporarily stores this data (step S201). Further, the image display server 3 resizes the original image based on this received original image data to a predetermined size (e.g., 800×600 pixels) corresponding to the image display region 104 of the image display apparatus 101 (the liquid crystal display panel 103), transmits this image to the image display apparatus 101, and displays the resized original image in the image display apparatus 101 (step S202).

Subsequently, the image display server 3 displays a window frame 702 (a window) depicted in FIGS. 10, 10B, 10C, and 10D and FIGS. 11A and 11B as a snapshot-to-painting conversion setting region in the image display region 104 of the image display apparatus 101 that displays the original image (step S203). This window frame 702 can be freely moved in the image display region 104 by a touch operation on the liquid crystal display panel 103 performed by the user, and the image display server 3 moves a position of the window frame 702 in the image display region 104 to positions 702a, 702b, 702, and 702d as shown in FIG. 11A, for example, in accordance with the touch operation of the user (step S204).

Figure 11A:
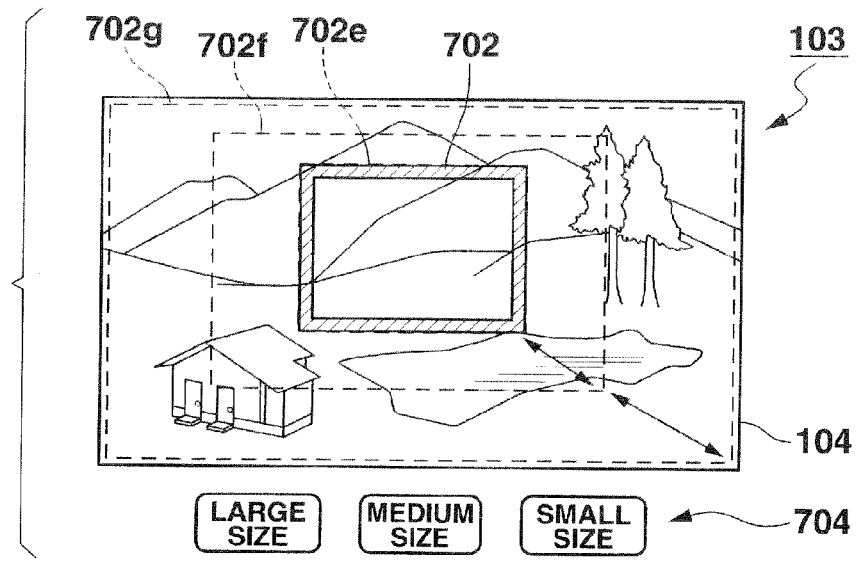
FIG. 11A is an explanatory view when changing a size of a window in the image display apparatus.

Furthermore, the image display server 3 displays size change buttons 704, which are used for changing a window size of the window frame 702 to any one of large, medium, and small sizes, outside the image display region 104 as shown in FIG. 11A while displaying the window frame 702 in the image display region 104. Moreover, when the user touches the size change button 704 corresponding to any one of the large, medium, and small sizes, the window size is changed to a small size 702e, middle size 702f, or large 702g as shown in FIG. 11A, for example (step 3205). The changed window size is 480×360 pixels when the size change button 704 indicative of the large size is touched, 320×240 pixels when the size change button 704 indicative of the medium size, or 160×120 pixels when the size change button 704 indicative of the small size is touched, for example.

Additionally, the image display server 3 allows the user to select a desired tone as a tone to which the image should be changed while displaying the window frame 702 in the image display region 104 (step S206). It is to be noted that tones can be changed in a normal order when the user slides his/her finger in the right-hand direction on the liquid crystal display panel 103, tones can be changed in a reverse order when the user slides his/her finger in the left-hand direction on the same, and the tone can be determined when an arbitrary position on the liquid crystal display panel 103 is touched twice in a short time (e.g., 0.5 second).

Additionally, when the user selects (decides) the tone, the snapshot-to-painting conversion server 4 immediately executes the snapshot-to-painting conversion with respect to the original image data (step S207). At this time, the snapshot-to-painting conversion server 4 converts the image data having 800×600 pixels obtained by resizing the original image data to painterly tone image data having the tone selected by the user. At this time, the snapshot-to-painting conversion server 4 carries out the snapshot-to-painting conversion using the first parameter group.

With this conversion, the image display server 3 (second display controller) switches an image in the window frame 702 alone to the converted image data and displays this image data in the image display region 104, and displays the original image data (the resized image data) outside the window frame 702 as it is (step S208). That is, the image display server 3 displays in the image display region 104 a display image which is the tone-changed image in the window frame 702 alone.

Here, although a specific display method of the display image at step S208 is arbitrary, an example for realising the display method is that a first layer of an image that is not subjected to the snapshot-to-painting conversion and a second layer of an image subjected to the snapshot-to-painting conversion are prepared in advance, the first layer is selected for the outside of the window frame 702 to display the original image, and the second layer is selected for the inside of the window frame 702 alone to display the tone-changed image. It is to be noted that, in this case, the display image constituted of the original image in the first layer and the tone-changed image in the second layer may be generated on the image display server 3 side, or the display image may be generated on the image display apparatus 101 side by supplying the pieces of image data in the respective layers to the image display apparatus 101.

Figure 10A:
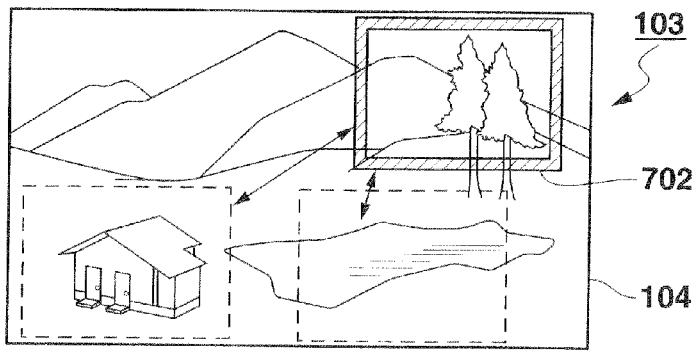
FIGS. 10A, 10B, 10C, and 10D are views each showing a display state in the image display apparatus for explaining a procedure of snapshot-to-painting conversion performed by the print order receiving apparatus.
Figure 10B:
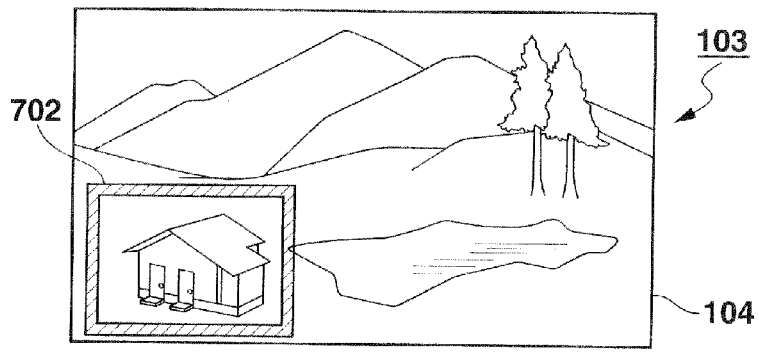
Figure 10C:
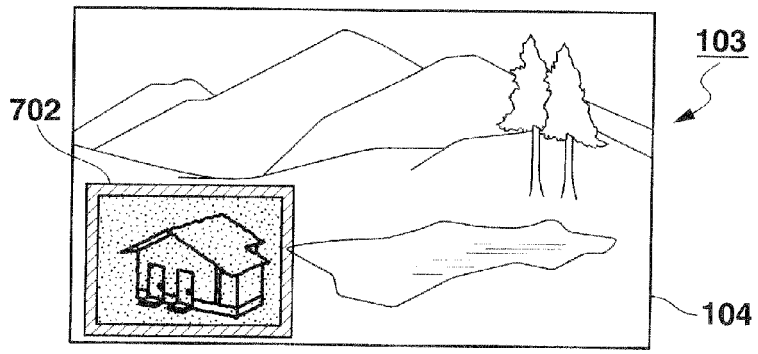
Figure 10D:
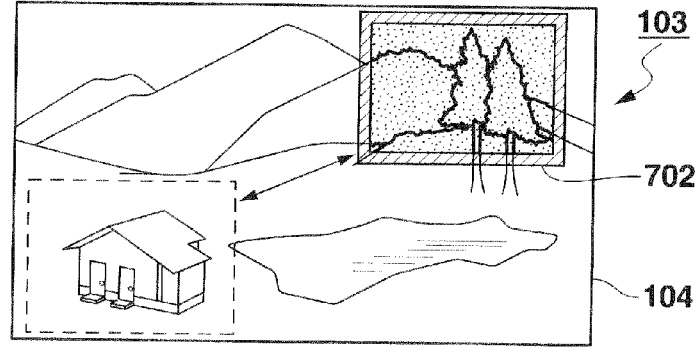
Figure 11B:
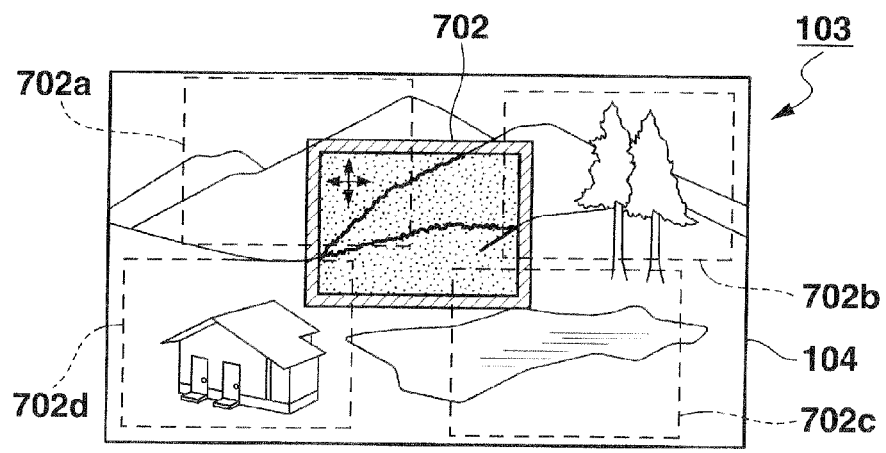
FIG. 11B is a view for explaining a situation where a window position is changed in the image display apparatus.

According to this configuration, as obvious from FIG. 10C, FIG. 10D, or FIG. 11B, the user can grasp a state acquired after the tone conversion, especially the snapshot-to-painting conversion at one glance and specify a desired portion to obtain an image having a necessary painterly tone.

Thereafter, in the print order receiving apparatus 1, step 204 to step S208 are repeated until the user decides the tone and the snapshot-to-painting conversion setting region (a size and a position of the window) (step S209: NO). That is, a type of tone, and a size and a position of the window frame 702 are repeatedly changed any number of times in accordance with operations of the user. It is to be noted that the operation of deciding the tone and the snapshot-to-painting setting region performed by the user is a predetermined touch operation such as a touch operation of describing a circle on the liquid crystal display panel 103.

Here, a size of the original image data is as large as 4000× 3000 pixels, and executing the snapshot-to-painting conversion processing in regard to this size takes time, but the conversion can be performed in a short time since the image resized for display is a processing target at step S207.

Further, in the print order receiving apparatus 1, when the tone and the snapshot-to-painting conversion setting region are decided (step S209: YES), the image display server 3 displays a predetermined size selection screen in the display screen of the image display apparatus 101, whereby the user can decide a desired size from predetermined sizes as print sizes (step S210). As the print sizes, there are an E print size, an L print size, a postcard size, a 2L print size, a cabinet size, and others (see FIG. 7).

Subsequently, when the above-described decision is made, the contents server 2 clips out image data of the snapshot-to-painting conversion setting region associated with the window frame 702 from the original image data specified by the user (step S211). Then, the snapshot-to-painting conversion server 4 uses a second parameter group for printing corresponding to the tone and the print size specified by the user, which is one of the second parameter groups P(s)(n) stored in the second parameter table 4a shown in FIG. 7, to carry out the snapshot-to-painting conversion with respect to the clipped image data (step S212). That is, the clipped image data is converted to image data having any tone.

At this moment, if a size of the window frame 702 selected by the user on the display screen is 320×240 pixels at step S212, since the original image data has 4000×3000 pixels, the snapshot-to-painting conversion is actually carried out with respect to image data having 1600×1200 pixels in the same region as that viewed in the display screen. Further, if the selected print size is the postcard size, processing for printing this image data having 1600×1200 pixels in the postcard size is performed. In this case, since a parameter associated with the postcard size is s3 in the example shown in FIG. 6, if the selected tone is the crayon drawing tone n4, the second parameter group used at step S212 is P(s3) (n4).

Thereafter, the contents server 2 transmits data of the tone-changed image subjected to the snapshot-to-painting conversion by the snapshot-to-painting conversion server 4 at step S211 to the print contractor terminal 301 and passes an order for a print to the print contractor (step S213). That is, the tone-changed image is printed by a printer owned by the print contractor. With this operation, the tone-changed image printed out by the printer owned by the print contractor is delivered to the user offline, e.g., by mail.

As described above, in this embodiment, when generating image data for printing in the print order receiving apparatus 1, the snapshot-to-painting conversion using the second parameter group P(s)(n) corresponding to each tone type (n) and each size (s) set for the YMCK components in the image data is carried out with respect to the original image data. Therefore, when performing the snapshot-to-painting conversion to arbitrary image data and printing the converted image in an arbitrary size, image data used for printing in a highly accurate tone can be generated.

Furthermore, in this embodiment, when the user of the image display apparatus 101 places an order for printing image data, the image display server 3 of the print order receiving apparatus 1 displays the movable window frame 702 in the display screen of the image display apparatus 101, changes an image inside the window frame 702 alone to image data subjected to the snapshot-to-painting conversion, displays this image data, and also displays the original image data outside the window frame 702 as it is.

Therefore, the user can check various regions on an image as a snapshot-to-painting conversion target and various types of tones before placing an order for printing image data, and he/she can readily decide a region in image data of an original image, a size, and a tone required when performing conversion.

Here, in this embodiment, although the description has been given as to the example of acquiring as the image data for printing the image data obtained by converting the original image data to the painterly tone, the tone (a tone) to which the original image data should be converted to may be any tone other than the painterly tone.

Moreover, in this embodiment, although the description has been given as to the example where the terminal, e.g., the image display apparatus 101 is accessible and the present invention is applied to the print order receiving apparatus 1 that converts image data received from the terminal to image data having a specific tone, the present invention can be also applied to the image display apparatus 101 in addition to this example. In such a case, for example, the internal memory 114 in the image display apparatus 101 previously stores the second parameter groups constituting the second parameter table 4a (FIG. 7) in addition to the first parameter groups constituting the first parameter table 114a (FIG. 6). Additionally, a predetermined program is stored in the ROM 112 in advance, and the CPU 111 is allowed to execute the same processing as that of the contents server 2 or the image display server 3 in the print order receiving apparatus 1 in accordance with this program.

Further, in this embodiment, the description has been given as to the example where the print order receiving apparatus 1 transmits the image data subjected to the snapshot-to-painting conversion to the print contractor terminal 301 to pass an order for printing an image having the painterly tone to the print contractor, i.e., allow the print contractor to perform an actual print operation. However, the print order receiving apparatus 1 may comprise a printer for printing images having the painterly tone to actually print the converted image having the painterly tone.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An image processing apparatus which is connectable to a terminal through a network, the apparatus comprising:
   a receiving unit configured to receive original image data having (X1)×(Y1) pixels from the terminal through the network;
   a converting unit configured to convert the original image data received by the receiving unit to tone-changed image data having any one of various types of tones;
   a storing unit configured to store parameter groups for converting the original image data by the converting unit, the parameter groups comprising a first parameter group for tone types set with respect to RGB components in the image data and a second parameter group for tone types and sizes set with respect to YMCK components in the image data;
   a display controller configured to display on the terminal, image data which is obtained by resizing the original image data and which has (X2)×(Y2) pixels, wherein X1>X2 and Y1>Y2;
   a print size selector configured to allow the terminal to select a print size having (XP)×(YP) pixels, wherein X1>XP and Y1>YP; and
   a print controller configured to issue a print instruction for converted image data obtained by the converting unit and having (X3)×(Y3) pixels, wherein X2>X3 and Y2>Y3,
   wherein the display controller is configured to:
      display a window that can be changed in size or position on a display screen of the terminal;
      display the converted image data, which is obtained by the converting unit using the first parameter group stored in the storing unit and which is said (X3)×(Y3) pixels, in a region of the window; and
      display image data, which is obtained by resizing the original image data and which has said (X2)×(Y2) pixels, outside the region of the window on the display screen of the terminal,
   wherein the display controller is configured to display, on the display screen of the terminal, an image corresponding to one original image data such that image data obtained by converting an original image into any one of the various type of tones is shown inside the region of the window, and image data of the original image not subjected to tone conversion is shown outside the region of the window, and
   wherein the print controller is configured to issue a print instruction for converted image data obtained by the converting unit using the second parameter group stored in the storing unit having (XP)×(YP) pixels selected by the print size selector, so as to satisfy (X2)×(Y2):(X3)×(Y3)=(X1)×(Y1):(XP)×(YP).

2. A print order receiving apparatus which comprises a server that is connectable to a terminal through a network, which converts a tone of original image data in response to an order request for a print from the terminal, and which issues a print instruction for the converted image data, the apparatus comprising:
   a receiving unit configured to receive the original image data having (X1)×(Y1) pixels;
   a first display controller configured to display on a display screen of the terminal, a resized image which is obtained by resizing the original image data received by the receiving unit and which has (X2)×(Y2) pixels, wherein X1>X2 and Y1>Y2;
   a size specifying unit configured to allow the terminal to specify a print size having (XP)×(YP) pixels based on the resized image, wherein X1>XP and Y1>YP;
   a tone specifying unit configured to allow the terminal to specify any one of various types of tones;
   a first tone converter configured to convert a tone of the resized image displayed on the display screen of the terminal to a tone specified by the tone specifying unit;
   a second display controller configured to display, in the display screen of the terminal, an image of the tone converted by the first tone converter in a region of a window that has (X3)×(Y3) pixels and that is movable in position and changeable in size, and to display the resized image outside the region of the window in the display screen, wherein X2>X3 and Y2>Y3;
   a storing unit configured to store a parameter group associated with YMCK components of image data corresponding to each of the various types of tones and each of various print sizes;
   a second tone converter configured to convert a tone of the original image data corresponding to an image in the region of the window to the tone specified by the tone specifying unit, by using the parameter group stored in the storing unit; and
   a print controller configured to issue a print instruction for the converted image data after the tone conversion by the second tone converter with respect to another device, so as to satisfy (X2)×(Y2):(X3)×(Y3)=(X1)×(Y1):(XP)×(YP).

3. A print order receiving method for a print order receiving apparatus which comprises a server connected to a terminal through a network, which converts a tone of original image data to a tone selected from any one of various types of tones in response to an order request for a print from the terminal, and which issues a print instruction for the converted image data, the method comprising:
   receiving the original image data having (X1)×(Y1) pixels;
   displaying a resized image which is obtained by resizing the received original image data and which has (X2)×(Y2) pixels on a display screen of the terminal, wherein X1>X2 and Y1>Y2;
   displaying, in the display screen of the terminal, an image of a tone converted to the selected tone in a region of a window that has (X3)×(Y3) pixels and that is movable in position and changeable in size, and displaying the resized image outside the region of the window in the display screen, wherein X2>X3 and Y2>Y3;
   allowing the terminal to specify a print size having (XP)×(YP) pixels, wherein X1>XP and Y1>YP;
   converting a tone of the resized image displayed on the display screen of the terminal based on a first parameter;

converting a tone of an image corresponding to the original image data in the region of the window to the converted tone of the resized image based on a second parameter; and issuing a print instruction for the converted original image data, so as to satisfy $(X2) \times (Y2):(X3) \times (Y3)=(X1) \times (Y1):(XP) \times (YP)$.

4. The method according to claim 3, wherein the first parameter is stored as a first table in accordance with each tone type, and the second parameter is stored as a second table in accordance with each tone type and each print size.

5. The method according to claim 3, wherein the first parameter is set in accordance with RGB components in the image data, and the second parameter is set in accordance with YMCK components in the image data.

6. An image processing apparatus which converts original image data to converted image data having any one of various types of tones by using any one of first parameter groups set in accordance with the various types of tones, and which displays the converted image data on a display screen, the apparatus comprising:

a tone determining unit configured to determine a tone of the converted image data;

a resizing unit configured to resize the original image data having $(X1) \times (Y1)$ pixels into image data having $(X2) \times (Y2)$ pixels, wherein $X1>X2$ and $Y1>Y2$;

a first tone converter configured to perform tone conversion with respect to image data resized by the resizing unit by using one of the first parameter groups which is set in accordance with the tone determined by the tone determining unit;

a window displaying unit configured to display the image data resized by the resizing unit on the display screen and display a window having a size of $(X3) \times (Y3)$ pixels in a display region of the image data, wherein $X2>X3$ and $Y2>Y3$;

a window position controller configured to move a position of the window;

a window size controller configured to change a size of the window;

a display controller configured to display image data subjected to tone conversion by the first tone converter in a region of the window that is moved in position by the window position controller and that is changed in size by the window size controller in the display screen and display the image data resized by the resizing unit outside the region of the window in the display screen;

a clipping unit configured to clip image data in a region corresponding to the window from the original image data;

a print size determining unit configured to determine a print size having $(XP) \times (YP)$ pixels, wherein $X1>XP$ and $Y1>YP$;

a storing unit configured to store second parameter groups for printing set in accordance with the various types of tones and print sizes; and a second tone converter configured to perform tone conversion with respect to the image data clipped by the clipping unit by using one of the second parameter groups that corresponds to the tone determined by the tone determining unit and the print size determined by the print size determining unit, so as to satisfy $(X2) \times (Y2):(X3) \times (Y3)=(X1) \times (Y1):(XP) \times (YP)$.

* * * * *